United States Patent
Koczo et al.

(10) Patent No.: US 7,879,918 B2
(45) Date of Patent: Feb. 1, 2011

(54) LOW-FOAMING GAS PROCESSING COMPOSITIONS AND USES THEREOF

(75) Inventors: Kalman Koczo, Suffern, NY (US); David George Quinn, Meyrin (CH)

(73) Assignee: Momentive Performance Materials Inc., Albany, NY (US)

(*) Notice: Subject to any disclaimer, the term of this patent is extended or adjusted under 35 U.S.C. 154(b) by 0 days.

(21) Appl. No.: 12/684,180

(22) Filed: Jan. 8, 2010

(65) Prior Publication Data

US 2010/0113855 A1    May 6, 2010

Related U.S. Application Data

(63) Continuation of application No. 11/400,976, filed on Apr. 10, 2006, now Pat. No. 7,678,835.

(51) Int. Cl.
*B01D 19/04* (2006.01)
*B01D 53/14* (2006.01)

(52) U.S. Cl. .......... 516/118; 585/860; 585/865

(58) Field of Classification Search ............. 516/118; 585/860, 865
See application file for complete search history.

(56) References Cited

U.S. PATENT DOCUMENTS

| | | |
|---|---|---|
| 3,505,377 A | 4/1970 | Morehouse |
| 3,846,329 A | 11/1974 | Householder et al. |
| 4,370,358 A | 1/1983 | Hayes et al. |
| 4,431,789 A | 2/1984 | Okazaki et al. |
| 5,314,672 A | 5/1994 | Vasil |
| 5,693,256 A | 12/1997 | Sawicki et al. |
| 6,051,533 A | 4/2000 | Kajikawa et al. |
| 6,156,808 A | 12/2000 | Chatterji et al. |
| 6,207,782 B1 | 3/2001 | Czech et al. |
| 6,267,938 B1 | 7/2001 | Warrender et al. |
| 6,369,022 B2 | 4/2002 | Hoogland et al. |
| 6,512,015 B1* | 1/2003 | Elms et al. ............ 516/118 |
| 6,521,587 B1 | 2/2003 | L'Hostis et al. |
| 6,929,680 B2 | 8/2005 | Krushnevych et al. |
| 2006/0000356 A1* | 1/2006 | Tomoe et al. ............ 95/236 |

FOREIGN PATENT DOCUMENTS

WO    2004048642    11/2003

OTHER PUBLICATIONS

C.L. Crawford, "Hydrogen Generation Rate Scoping Study of Dow Corning Antifoam Agent" American Chemical Society 57th Southwest/61st Southwest Regional Meeting, Nov. 1-4, 2005, Memphis, TN.
"SAG*7133 and SAG*220 Antifoams for Gas Processing," GE-Advanced Materials, copyright 2003-2006, General Electric Company.
"OSi Antifoams In the Alkanolamine Process of Gas Scrubbing," EU-36-018/KS/FJ/January, Copyright 2001, Crompton Corporation.

* cited by examiner

*Primary Examiner*—Ling-Siu Choi
*Assistant Examiner*—Chun-Cheng Wang
(74) *Attorney, Agent, or Firm*—Dominick G. Vicari

(57) ABSTRACT

The invention relates to low-foaming gas processing compositions comprising (a) a silicone antifoam component comprising a base silicone fluid and a particulate metal oxide; (b) an emulsifying component in an amount suitable for the at least substantial emulsification of the silicone antifoam component in water; (c) a polypropylene glycol component at least partially soluble, emulsifiable, and/or dispersible in water; (d) a water-soluble or water-dispersible gas processing agent; and (e) water. The invention also relates to methods for processing a gas by treating the gas with these foam suppressing compositions.

19 Claims, 2 Drawing Sheets

LOW-FOAMING GAS PROCESSING COMPOSITIONS AND USES THEREOF

CROSS REFERENCE TO RELATED APPLICATIONS

The present application is a continuation of U.S. application Ser. No. 11/400,976 filed Apr. 10, 2006 now U.S. Pat. No. 7,678,835 to which priority is claimed.

BACKGROUND OF THE INVENTION

1. Field of the Invention

The invention relates to low-foaming gas processing compositions of particular use in gas sweetening processes.

2. Description of the Prior Art

In the gas sweetening process, a gas (e.g., natural gas), is purified of base-reactive impurities, such as carbon dioxide and hydrogen sulfide, typically by treatment with one or more suitably reactive amine compounds. The amine forms an adduct with the base-reactive impurity, thereby removing the impurity from the gas. See, for example, U.S. Pat. Nos. 6,929,680 to Krushnevych et al. and 5,314,672 to Vasil, et al.

There has been much focus on anti-foaming technologies in the areas of detergents, polymer processing, well treating, and waste streams. These antifoaming technologies are generally not well suited for the reduction of foam in gas sweetening processes. See, for example, U.S. Pat. Nos. 3,846,329 to Householder et al., 6,156,808 to Chatterji et al., 6,369,022 to Hoogland et al., 6,512,015 to Elms et al., and 6,521,587 to L'Hostis et al., and C. L. Crawford, "Hydrogen Generation Rate Scoping Study of DOW Corning Antifoam Agent," ACS 57$^{th}$ Southeast/61$^{st}$ Southwest Regional Meeting, No. 429, Memphis, Tenn.

It is known in the art to include an antifoam composition for the suppression of foam in gas sweetening operations. For example, an antifoaming formulation containing a silicone antifoam component, a polydimethylsiloxane-polyoxyalkylene copolymer emulsifier, and water, in the absence of polypropylene glycol, is commercially available for this purpose under the trade name Sag®7133 (see "OSi Antifoams in the Alkanolamine Process of Gas Scrubbing," EU-36-018/KS/fk/January, ©2001 Crompton Corporation; and "SAG®7133 and SAG®220," GE-Advanced Materials, © 2003-2006 General Electric Company).

However, there still remains a need for gas sweetening compositions with more effective foam controlling properties. The present invention is directed to this need.

BRIEF DESCRIPTION OF THE INVENTION

These and other objectives, as will be apparent to those of ordinary skill in the art, have been achieved by providing low-foaming gas processing compositions comprising:
(a) a silicone antifoam component comprising a base silicone fluid and a particulate metal oxide;
(b) an emulsifying component in an amount suitable for the at least substantial emulsification of the silicone antifoam component in water;
(c) a polypropylene glycol component at least partially soluble, emulsifiable and/or dispersible in water;
(d) a water-soluble or water-dispersible gas processing agent; and
(e) water.

In a preferred embodiment, a low-foaming gas sweetening composition comprises:
(a) a silicone antifoam component comprising a base silicone fluid and particulate silica, the particulate silica in an amount of up to about ten percent by weight of silicone antifoam component;
(b) one or a combination of polydimethylsiloxane-polyoxyalkylene co-polymers and/or organic emulsifiers;
(c) a polypropylene glycol component at least partially soluble, emulsifiable and/or dispersible in water in a polypropylene glycol to silicone antifoam component weight ratio range of approximately 1:10 to 10:1;
(d) a gas sweetening amine; and
(e) water.

The present invention is also directed to a method for processing a gas by treating the gas with a composition described above. In a preferred embodiment, the invention is directed to a method of lowering or substantially removing an amount of one or more base-reactive impurities from a gas by treating the gas with any of the compositions described above. In a preferred embodiment, the gas is treated with a composition prepared by:
(a) providing an antifoam composition comprising
  (i) a silicone antifoam component comprising a base silicone fluid and a particulate metal oxide;
  (ii) an emulsifying component in an amount suitable for the at least substantial emulsification of the silicone antifoam component in water;
  (iii) a polypropylene glycol component at least partially soluble, emulsifiable and/or dispersible in water;
  (iv) water;
(b) providing an aqueous amine solution comprising one or more alkanolamines, alkylamines, or combination thereof, in aqueous solution; and
(c) mixing the antifoam composition with the aqueous amine solution to provide a mixture having the antifoam composition in a minimum amount of approximately 1 ppm to a maximum of about approximately 2000 ppm by weight of the solid mixture.

The present invention advantageously provides gas processing formulations having improved foam suppressing ability in gas sweetening and related processes. Additionally, the compositions are cost-effective and readily dispersible in aqueous solutions.

DETAILED DESCRIPTION OF PREFERRED EMBODIMENTS

Figure 1:
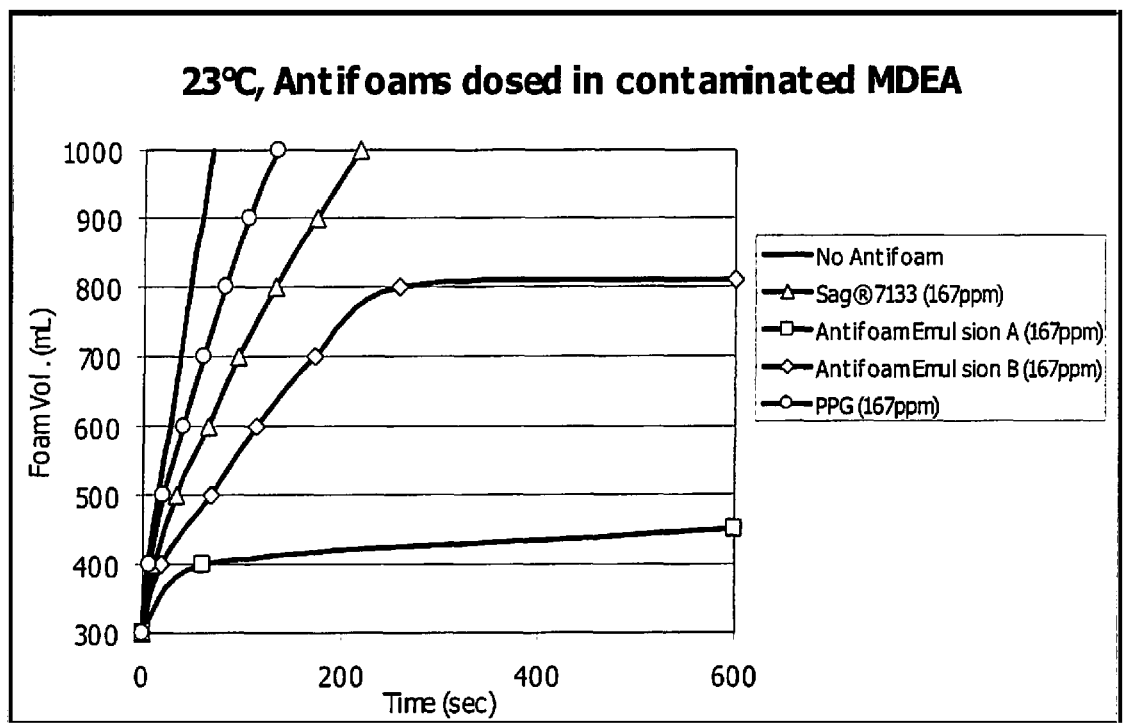
FIG. 1 compares the foam controlling ability of MDEA gas sweetening formulations which also contained 0.1 weight percent (0.1 wt %) of an anionic surfactant, such as sodium lauryl sulfate, to stabilize the foam containing either a silicone antifoam component without PPG (i.e., Sag®7133) or PPG without silicone antifoam component against formulations containing a combination of silicone antifoam component and PPG (i.e., ANTIFOAM EMULSION B or ANTIFOAM EMULSION A), all dosed at 167 ppm at room temperature (circa 23° C.) in the gas sweetening formulation.

The low-foaming gas processing compositions of the invention include a silicone antifoam component (i.e., component (a)). The silicone antifoam component includes, minimally, a base silicone fluid and a particulate metal oxide.

The base silicone fluid is preferably a polydimethylsiloxane-containing (i.e., PDMS-containing) polymer. More preferably, the base silicone fluid is a silicone oil. The silicone fluid can have any suitable viscosity, e.g., 0.65 Centistokes (cSt) to 1,000,000 cSt, and more preferably 0.65 Centistokes (cSt) to 100,000 cSt, and even more preferably, about 100 cSt to about 20,000 cSt. The molecular weights of the silicone fluid is preferably in the range of about 2,000 to about 500,000.

The base silicone fluid can also be a mixture of two or more silicone fluids of different viscosities. For example, the base silicone fluid can be a mixture of two or more low viscosity silicone fluids (e.g., 100 cSt-500 cSt), two or more high viscosity silicone fluids (e.g., 1,000-20,000 cSt), or one or more low viscosity silicone fluids in combination with one or more high viscosity silicone fluids.

The amount of base silicone fluid in the silicone antifoam component is preferably an amount at least necessary to coat the particulate metal oxide. Preferably, the base silicone fluid is in a weight ratio to metal oxide of at least about 1:1 to 50:1. More preferably, the base silicone fluid is in a weight ratio to metal oxide of at least about 8:1 to 50:1, or higher ratio. For example, in different embodiments, the base silicone fluid can preferably be in a weight ratio to metal oxide of, or greater than, about 1:1, 2:1, 3:1, 4:1, 5:1, 10:1, 12:1, 15:1, 20:1, 25:1, 30:1, 40:1, or 50:1.

The particulate metal oxide can be any of the suitable metal oxides known in the art. Some examples of suitable metal oxides include fumed, precipitated, or plasmatic forms of titania, alumina, silica, alumina-silica, zirconia, zirconia-silica, and any combinations thereof.

Particularly preferred for the metal oxide is silica. The particulate silica can be any suitable form of particulate silica, including fumed and precipitated forms of silica. Combinations of fumed and precipitated forms of silica are also contemplated.

The metal oxide, and particularly silica, can be hydrophilic when combined with the base silicone fluid. Alternatively, the metal oxide can be pre-hydrophobized using a suitably hydrophobic organosilane or alkyl-containing silicone fluid before being combined with the base silicone fluid. For example, the metal oxide can be pre-hydrophobized by reaction with a hydrophobic silane compound (e.g., $(CH_3)_3SiOH$, $(CH_3)_3SiCl$ or hexamethyldisilazane) prior to mixing with the base silicone fluid.

The particulate metal oxide can also include a mixture of pre-hydrophobized and non-prehydrophobized (i.e., hydrophilic) forms of the metal oxide. In such mixtures, the metal weight ratio of pre-hydrophobized to non-prehydrophobized silicas is preferably in the range of about 1:20 to 20:1. For example, in different embodiments, the weight ratio of pre-hydrophobized to non-prehydrophobized silicas can be preferably 1:20, 1:10, 1:5, 1:4, 1:3, 1:2, 1:1, 2:1, 3:1, 4:1, 5:1, 10:1, or 20:1.

In addition, the hydrophobized portion of metal oxide need not be completely surface-coated with hydrophobizing agent. For example, the hydrophobized metal oxide can be partially hydrophobized, e.g., 95%, 90%, 80%, 70%, or 50% of its surface may be hydrophobized.

Suitable hydrophobized forms of silica are commercially available. Particularly preferred forms of hydrophobized silica are available under the Sipernat® and Aerosil® trade names.

The particulate metal oxide can have any suitable particle size. For example, the metal oxide can have a minimum particle size of about five nanometers and a maximum particle size of up to hundreds of microns. More preferably, the metal oxide has an average particle size in the range of about 1 to 20 microns. The surface area is preferably within the range of about 50 to 1000 square meters per gram ($m^2/g$). For example, the metal oxide can be selected to have a surface area in the range of about 50 to about 500, or about 60 to about 450, or about 80 to about 400.

The amount of particulate metal oxide is preferably no more than about 20% by weight of the silicone antifoam component. For the silicas, an amount in the range of about 1 to 20% is preferable. Preferably, the silica is in an amount of up to about 10% by weight of silicone antifoam component. More preferably, fumed silica is present in an amount of no more than 6% by weight and precipitated silica in an amount of no more than 15% by weight of the silicone antifoam component. The silicas are preferably in an amount of about 3 to 10% by weight of the silicone antifoam component. The silicas can also be in much lower amounts of, for example, 1% or less.

The silicone antifoam component can optionally include one or more branched silicone resins. Particularly preferred branched silicone resins are the MQ, MDQ, or T silicone resins, wherein M represents monovalent groups of formula $(CH_3)_3SiO_{1/2}$, D represents divalent groups of formula $(CH_3)_2SiO_{2/2}$, T represents trivalent groups of formula $(CH_3)SiO_{3/2}$, and Q represents tetravalent groups of formula $SiO_{4/2}$.

Particularly preferred branched silicone resins are the MQ resins, which are well known in the art. See, for example, U.S. Pat. Nos. 4,370,358 to Hayes et al. and 5,693,256 to Sawicki et al., both of which are incorporated herein by reference in their entirety. The MQ resin can have any suitable M:Q ratio, and more preferably, an M:Q ratio within the approximate range of 0.1:1 to 1.5:1 or 0.1:1 to 2:1. More preferably, the M:Q ratio is in the approximate ratio of from about 0.5:1 to about 1.1:1. For example, in different embodiments, the M:Q ratio can be preferably about 0.1:1, 0.2:1, 0.3:1, 0.4:1, 0.5:1, 0.6:1, 0.7:1, 0.8:1, 0.9:1, 1:1, 1.1:1, 1.2:1, 1.5:1, and 2:1. A particularly suitable MQ resin is commercially available under the trade name SR 1000 from GE Silicones.

The branched silicone resin can be in any suitable weight ratio to the metal oxide component, both of which are in the silicone antifoam component. Preferably, the branched silicone resin is in a weight ratio of branched silicone resin to metal oxide in the range of about of 1:1 to about 10:1. For example, in different embodiments, the weight ratio of branched silicone resin to metal oxide can preferably be about 1:1, 2:1, 3:1, 4:1, 5:1, 6:1, 7:1, 8:1, 9:1, or 10:1. In other embodiments, it may be preferable for the branched silicone resin to metal oxide weight ratio to be as low as 1:4 or as high as 20:1.

The silicone antifoam component can also optionally include one or more catalysts capable of promoting condensation reactions between siloxy groups. Some examples of such catalysts include alkali metal hydroxides (e.g., potassium hydroxide, sodium hydroxide, and cesium hydroxide), alkali metal silanolates (e.g., potassium silanolate), alkali metal alkoxides (e.g., potassium ethoxide), quaternary ammonium hydroxides (e.g., betahydroxyethyltrimethyl ammonium hydroxide, benzyltrimethyl ammonium hydroxide, tetramethyl ammonium hydroxide), quaternary ammonium silanolates, quaternary phosphonium hydroxides, and metal salts of organic acids (e.g., dibutyltin laurate, stannous acetate, stannous octanoate, and the like).

In a preferred embodiment, the silicone antifoam component includes both a branched silicone resin and a catalyst, as described above. In a particularly preferred embodiment, the silicone antifoam component includes an MQ silicone resin and a catalyst.

The low-foaming gas processing composition of the invention also includes an emulsifying component (i.e., component (b)). The emulsifying component is included in an amount suitable for the at least substantial emulsification of the silicone antifoam component in water. By "at least substantial emulsification" is meant that the antifoam component be emulsified by at least about 90% in water or in aqueous solution containing water in a predominant amount. For example, the emulsifying component can be in a weight ratio of emulsifying component to silicone antifoam component from 1:1, to 1:20 depending on the type of emulsifier and silicone antifoam component. For example, in different embodiments, the weight ratio of emulsifying component to silicone antifoam component can preferably be about 1:1, 1:2, 1:3, 1:4, 1:5, 1:10, 1:15, or 1:20.

In one embodiment, the emulsifying component includes an organic emulsifier. Some examples of particularly preferred organic emulsifiers include the alcohol ethoxylates, nonylphenol ethoxylates, and sorbitan esters. Some more specific examples of such organic emulsifiers include polyoxyethylene sorbitan monostearate, sorbitan monostearate, polyoxyethylene stearate, and silicone polyethers (e.g., the commercially available Silwet L-7220®).

In another embodiment, the emulsifying component includes a silicone-based emulsifier. Preferably, the silicone-based emulsifiers are copolymers having one or more polydimethylsiloxane portions and one or more hydrophilic or hydrophobic portions, of which a particularly preferred subclass is the polydimethylsiloxane-polyoxyalkylene copolymers (PDMS-polyoxyalkylene copolymers).

Particularly preferred emulsifiers are PDMS-polyoxyalkylene copolymers wherein the polyoxyalkylene portion is composed of oxyethylene units, oxypropylene units, or a combination thereof. Such copolymers are well known in the art and are commercially available under the Silwet® trade name. These commercially available PDMS-polyoxyalkylene copolymers are described in detail in U.S. Pat. Nos. 3,505,377 to Morehouse and 6,051,533 to Kajikawa et al., both of which are incorporated by reference herein in their entirety.

The PDMS-polyoxyalkylene polymers can be of any arrangement of PDMS and polyoxyalkyene units, but are preferably either linear or pendant copolymers (see formulas I and II in U.S. Pat. No. 6,051,533 to Kajikawa et al.). Combinations of linear and pendant copolymers are also contemplated.

In a particularly preferred embodiment, the emulsifying component includes one or more, more preferably two or three, pendant PDMS-polyalkylene copolymers within the formula:

$$MD_xD^*_yM \quad (1)$$

In formula 1, M represents monovalent groups of formula $(CH_3)_3SiO_{1/2}$, D represents divalent groups of formula $(CH_3)_2SiO_{2/2}$, and D* represents divalent groups of formula

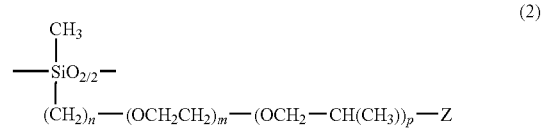

In formula 1, x is a number greater than zero, and more preferably at least ten, and y is a number of at least one and up to fifteen. In formula 2, n preferably represents an integer between 1 and 6; and m and p independently represent a minimum of zero and preferably, a maximum of about 100, provided that at least one of m and p is not zero. Z represents a capping group preferably selected from —OCH$_3$, —OCH$_2$CH$_3$, or —OH. More preferably, Z represents a methoxy group.

In a more preferred embodiment, x is a minimum of about 1 and a maximum of about 400, y is a minimum of 1 and maximum of 10, n is 3, m is between 5 and 20, and p is zero or a number between 0 and 30.

The values provided above for the preferred pendant PDMS-polyalkylene copolymers emulsifiers are averages and are not intended to represent absolute values.

The low-foaming gas processing composition of the invention also includes a polypropylene glycol component (i.e., component (c)). The inventors have surprisingly found that there is a synergistic effect in the present invention in the combination of polypropylene glycol and silicone antifoam component. The combination results in formulations with more effective antifoaming ability as compared to formulations containing either polypropylene glycol or silicone antifoaming component.

Polypropylene glycols of any molecular weight, viscosity, and hydroxyl number, and which are at least partially soluble, dispersible, and/or emulsifiable in water, are suitable according to the present invention. By being "at least partially soluble, dispersible, and/or emulsifiable in water" includes solubility, dispersibility, or emulsifiability at room temperature (circa 25° C.), as well as under elevated temperature conditions (warming or heating conditions). Warming or heating can be provided as a separate step to induce or aid solubilization, dispersion, or emulsification, or can be provided, if applicable, during use of the formulation in gas processing.

The term "polypropylene glycol" herein also includes all of the polymers under the term "polypropylene oxide," as well as any of the water-soluble co-polymers having polypropylene glycol portions and one or more other portions. For example, the polypropylene glycol can be a copolymer of polypropylene glycol and ethylene glycol. The copolymers can be in any arrangement, e.g., block, random, alternating, graft, or combinations thereof. The polypropylene glycol can also include additional functionality, e.g., polypropylene glycol bis-(2-aminopropyl ether) and polypropylene glycol monobutyl ether.

The polypropylene glycol can also be linear or branched, as well as atactic or isotactic. An example of a branched polypropylene glycol is the product of copolymerizaton between propylene oxide and a triol, such as glycerol, i.e., poly(propylene glycol)triol (otherwise known as glycerol propoxylate).

Some examples of suitable polypropylene glycols include those with number average molecular weights ($M_n$) of about 50 to about 5,000, viscosities of about 10 to about 2,000 centistokes, and hydroxyl numbers of about 10 mg KOH/g to about 400 mg KOH/g. For example, the polypropylene glycol can have an $M_n$ of about 425, a viscosity of 80 centistokes, and a hydroxyl number of about 263 mg KOH/g; or an $M_n$ of about 725, a viscosity of 115 centistokes, and a hydroxyl number of about 147 mg KOH/g; or an $M_n$ of about 1,000, a viscosity of 150 centistokes, and a hydroxyl number of about 111 mg KOH/g; or an $M_n$ of about 2,000, a viscosity of 300 centistokes, and a hydroxyl number of about 56 mg KOH/g; or an $M_n$ of about 2,700, a viscosity of 630 centistokes, and a hydroxyl number of about 37 mg KOH/g; or an $M_n$ of about 3,500, a viscosity of 1,300 centistokes, and a hydroxyl number of about 28 mg KOH/g; or any combination of any of the polypropylene glycols described above.

The polypropylene glycol component and antifoam component can be in any suitable weight ratio of polypropylene glycol to silicone antifoam component. For example, the polypropylene glycol to silicone antifoam component weight ratio is preferably in the approximate range of 1:20 to 100:1 or 1:20 to 200:1. For example, in different embodiments, the polypropylene glycol to silicone antifoam component weight ratio can be preferably about 1:20, 1:10, 1:5, 1:4, 1:3, 1:2, 1:1, 2:1, 3:1, 4:1, 5:1, 10:1, 20:1, 30:1, 40:1, 50:1, 100:1 or 200:1.

More preferably, the polypropylene glycol to silicone antifoam component weight ratio is in the approximate range of about 2:1 to 100:1, more preferably 2:1 to 50:1, more preferably 2:1 to 20:1, and even more preferably 2:1 to 10:1. In other embodiments, the polypropylene glycol to silicone antifoam component weight ratio is preferably in the approximate range of about 1:10 to 10:1, or a subrange therebetween, e.g., 1:1 to 10:1, 1:10 to 1:1, 1:5 to 5:1, 1:1 to 5:1, or 1:5 to 1:1.

The low-foaming gas processing composition of the invention also includes a water-soluble or water-dispersible gas processing agent (i.e., component (d)). In a preferred embodiment, the gas processing agent is a gas sweetening agent, and more preferably, a gas sweetening amine.

The gas sweetening amine includes any one or combination of amino-containing compounds or polymers capable of reacting with a base-reactive impurity of the gas while in the present formulation. The amines are preferably at least partially soluble in aqueous solution. If necessary, amines of low aqueous solubility can be emulsified using one or more suitable surfactants.

Some examples of classes of suitable gas sweetening amines include alkanolamines, alkylamines, and combinations thereof. Some particularly preferred alkanolamines include monoethanolamine, diethanolamine (DEA), diisopropanolamine, triethanolamine, N-methyldiethanolamine (MDEA), monomethylethanolamine, (2-(2-aminoethoxy) ethanol (i.e., Diglycolamine® Agent or DGA® available from Huntsman Corporation), and combinations thereof.

Some examples of classes of suitable gas sweetening alkylamines include monoalkylamines, dialkylamines, trialkylamines, and combinations thereof. Some examples of monoalkylamines include methylamine, ethylamine, n-propylamine, isopropyl amine, n-butylamine, isobutylamine, sec-butylamine, and t-butylamine. Some examples of dialkylamines include dimethylamine, diethylamine, methylethylamine, isopropylmethylamine, isopropylethylamine, diisopropylamine, and isobutylmethylamine. Some examples of trialkylamines include trimethylamine, triethylamine, tri(n-propyl)amine, ethyldimethylamine, n-propyldimethylamine, isobutyldimethylamine, and diisopropylmethylamine.

The gas sweetening amines also include the polyamines, i.e., diamines, triamines, tetramines, and higher amines. Some examples of such amines include ethylenediamine, diethylenetriamine, triethylenetetramine, tetraethylenepentamine, and polyamine polymers.

The gas sweetening amines also include amino-containing ring compounds. Some examples of such compounds include the piperidines, piperazines, pyridines, pyrazines, pyrroles, pyrrolidines, pyrrolidinones, morpholines, anilines, aminophenols, anisidines, triazines, and the like.

The gas sweetening amines also include imines formed by a condensation reaction between an amine and a carbonyl-containing compound such as formaldehyde.

The gas sweetening amines can be non-selective, and hence, reactive to any number of base-reactive impurities in a gas. Alternatively, the gas sweetening amines can be selective, i.e., more reactive to one or a particular group of base-reactive impurities, or perhaps unreactive to one or more base-reactive impurities while reactive to one or more other base-reactive impurities.

The low-foaming gas processing composition of the invention also includes water (i.e., component (e)). The water component can be purely water or substantially water along with an amount of one or more hydrophilic solvents. For example, the water component can include one or more alcohols, cyclic ethers, or ketones. The water component is typically the highest amount by weight of the formulation (e.g., at least 50, 60, 70, 80, or 90 percent by weight).

The invention also relates to a method for lowering or substantially removing an amount of one or more base-reactive impurities from a gas by treating the gas with any of the gas processing compositions described above. The method advantageously processes the gas while effectively suppressing the formation of foam.

The gas to be processed can be any of the commonly known gases which require removal of base reactive species. In a preferred embodiment, the gas is at least substantially composed of methane, i.e., natural gas. The gas can also be any other hydrocarbon gas including ethane, propane, butane, and the like, as well as inert gases, such as nitrogen and the noble gases.

The base-reactive impurities in the gas are most commonly carbon dioxide, sulfhydryl-containing compounds, and combinations thereof. The sulfhydryl-containing compounds include, most notably, hydrogen sulfide, but can include other mercaptans such as methanethiol.

In the process, the gas can be treated by any means known in the art for gas sweetening or gas dehydration. For example, the gas can be treated by spraying or aerosoling the formulations described above in the gas, or bubbling the gas through the gas processing formulation. See, for example, "Oilfield Processing of Petroleum: Natural Gas (Oilfield Processing of Petroleum)" by Francis S. Manning, © 1991, PennWell Publishing Co., Tulsa, Okla., which is herein incorporated by reference in its entirety.

In a preferred embodiment, the gas processing agent, e.g., gas sweetening amine, is regenerated by a gas desorption process. In the gas desorption process, elevated temperature and/or reduced pressure is used to effect the desorption of the adducted base-reactive species, thereby regenerating at least a portion, and more preferably at least a substantial portion, of the gas processing agent.

In a preferred embodiment, the method for treating a gas is accomplished by treating the gas with a composition prepared as follows. An antifoam composition is provided which comprises:

a silicone antifoam component comprising a base silicone fluid and a particulate metal oxide;
(a) an emulsifying component in an amount suitable for the at least substantial emulsification of the silicone antifoam component in water;

(b) a polypropylene glycol component at least partially soluble, emulsifiable, and/or dispersible in water; and (c) water An amount of the antifoam composition above is then mixed with an aqueous solution containing a gas processing agent. For example, in a preferred embodiment, an amount of the above antifoam composition is mixed with an aqueous amine gas sweetening solution so as to provide a mixture having the antifoam composition in a minimum amount of approximately 1 ppm or 10 ppm to a maximum amount of about 1000 ppm or 2000 ppm, and all ranges resulting from combination of the minima and maxima given, and all subranges therebetween, by weight of the silicone and polypropylenegylcol actives combination or by weight of the final mixture. The resulting mixture containing the amine is used to treat the gas in a gas sweetening process.

For gas sweetening applications, an aqueous amine solution comprises one or more alkanolamines, alkylamines, or combination thereof, in aqueous solution, preferably in a minimum amine weight percentage of about 5% and a maximum amine weight percentage of about 75% by weight of the aqueous solution. Some more preferred amine concentrations include 15 to 30 weight percent of monoethanolamine, or 30 to 40 weight percent of diethanolamine, or 40 to 50 weight percent of methyldiethanolamine, or up to about 65 weight percent of 2-(2-aminoethoxy)ethanol, and combinations thereof.

Numerous other auxiliary ingredients can be included to the gas processing composition described herein. For example, it is common practice to include one or more components selected from biocides, diluents, thickeners, pH adjusters, buffers, or oxidation inhibitors.

Examples have been set forth below for the purpose of illustration. The scope of the invention is not to be in any way limited by the examples set forth herein.

EXAMPLE 1

A gas processing composition was prepared by first making Antifoam Emulsion A. The emulsion contained 15% Sag 8200 silicone antifoam, 0.25% of a polydimethylsiloxane-polyalkylene copolymer which contained 40% polyethylene oxide, with a methyl end-group, and had a molecular weight of 10,000 Daltons, 1.5% of a polydimethylsiloxane-polyalkylene copolymer which contained 15% polyethylene oxide, 30% polypropylene oxide, with a methyl end-group and had a molecular weight of 50,000 Daltons and 0.25% of a polydimethylsiloxane-polyalkylene copolymer which contained 5% polyethylene oxide, 15% polypropylene oxide, with a methyl end-group and had a molecular weight of 20,000 Daltons, 30% polypropylene glycol with a molecular weight of 2000 Daltons, 1% Acusol 830, 0.23% Sodium hydroxide solution (20%), 0.1% Ucarcide 250 and 51.67% deionized water.

An amount of the above ANTIFOAM EMULSION A was then mixed with an aqueous amine solution (e.g., 30 to 40 weight percent of DEA or 40 to 50 weight percent MDEA in aqueous solution, which also contained 0.1 weight percent of an anionic surfactant, such as sodium lauryl sulfate to stabilize the foam) to provide a mixture having the antifoam composition in a minimum amount of approximately 1 ppm to a maximum of about 2000 ppm by weight of the silicone and polypropylene glycol actives combination or by weight of the mixture.

EXAMPLE 2

The antifoaming composition was prepared by mixing one part of the above antifoaming precursor formulation, also referred to herein as Sag® 7133, with one part polypropylene glycol (PPG 2025), resulting in a composition referred to herein as ANTIFOAM EMULSION B.

To form the final gas processing composition, an amount of the above ANTIFOAM EMULSION B composition containing PPG was mixed with an aqueous amine solution (e.g., 30 to 40 weight percent of DEA or 40 to 50 weight percent MDEA in aqueous solution, which also contained 0.1 weight percent of an anionic surfactant, such as sodium lauryl sulfate to stabilize the foam) to provide a mixture having the antifoam composition in a minimum amount of approximately 1 ppm to a maximum of about 2000 ppm by weight of the silicone and polypropyleneglycol actives combination or by weight of the mixture.

EXAMPLE 3

Application Testing

In a 1000 mL clean volumetric cylinder, 300 mL of the test foaming solution, e.g., 30 to 40 wt % of DEA (diethanolamine) or 40 to 50 wt % MDEA (methyldiethanolamine) in water, which also contained zero point one weight percent of an anionic surfactant, such as sodium lauryl sulfate, to stabilize the foam, is placed into the volumetric cylinder. The volumetric cylinder is placed securely on the bench at ambient temperature or alternatively submersed and secured in a water bath preheated to the application temperature desired.

The antifoam is then accurately dosed into the solution under the meniscus layer by aid of a micropipette. A glass frit connected to a compressed gas source via a hollow glass rod and suitable hosing is then immersed and submerged into the testing solution. When the testing solution has reached the desired test temperature, compressed air is sparged into the testing solution at 4 L/min. The flow rate of the gas is controlled by an appropriate and suitable gas flowmeter. A suitable stopwatch is simultaneously started upon the introduction of the gas sparge.

The increasing foam volume against sparging time is measured until the foam volume has reached a maximum of 1000 mL or 10 minutes of the sparge has elapsed.

Antifoam Preparation

Simple laboratory silicone-based antifoams of 100 grams in weight, incorporating a silicone antifoam component and a polypropylene oxide component can be prepared by the following method. Using a clean and suitable laboratory vessel or reactor, secure the vessel and insert a suitable mechanical mixer into the lab reactor. The lab mixer should be fitted with a suitable mixing blade in terms of its type, e.g. a saw-tooth, and its geometry. Accurately weigh 50 grams of a suitable silicone antifoam emulsion, e.g., Sag®7133, into the reactor. Immerse the mixing blade into the emulsion and begin to mix the emulsion at 300 rpm. Accurately weigh 50 grams of a suitable polypropylene oxide and slowly add this component into the agitating mixture in the reactor.

Once all the polypropylene oxide has been added into the laboratory reactor, continue to mix the resultant mixture for a further 30 minutes at 300 rpm. Stop and remove the mechanical laboratory mixer from the reactor and transfer the contents of the lab reactor into a clean and suitable laboratory storage vessel for future evaluations. Optionally, a small amount, typically 0.001% of biocide (e.g., based upon isothiazolone chemistry, such as Kathon LXE), can be added to protect the prepared antifoam component from bacterial attack.

Discussion of the Figures

As shown in FIG. 1, the compositions described above in Example 1 containing a silicone antifoam component in combination with polypropylene glycol (i.e., ANTIFOAM EMULSION A and ANTIFOAM EMULSION B, respectively) were tested for foam control by being dosed at 167 ppm in a 40 to 50 weight percent MDEA solution which also contained zero point one weight percent of an anionic surfactant, such as sodium lauryl sulfate, to stabilize the foam, used in a gas processing run, and these results compared against the foam controlling abilities of polypropylene glycol in the absence of silicone antifoam component (i.e., PPG) and a formulation containing silicone antifoam component in the absence of polypropylene glycol (i.e., Sag® 7133) at the same concentrations under the same conditions in a similarly concentrated MDEA solution which also contained zero point one weight percent of an anionic surfactant, such as sodium lauryl sulfate, to stabilize the foam.

FIG. 1 shows that the foam controlling abilities of formulations containing either of the components in an uncombined state (i.e., PPG and Sag® 7133) are significantly less than the foam controlling abilities of formulations containing a combination of a silicone antifoam component and PPG (i.e., ANTIFOAM EMULSION A and ANTIFOAM EMULSION B). Accordingly, it is evident that an unexpected synergistic effect between silicone antifoam component and PPG is involved in the observed improvement in suppression of foam in the formulations of the present invention.

Figure 2:
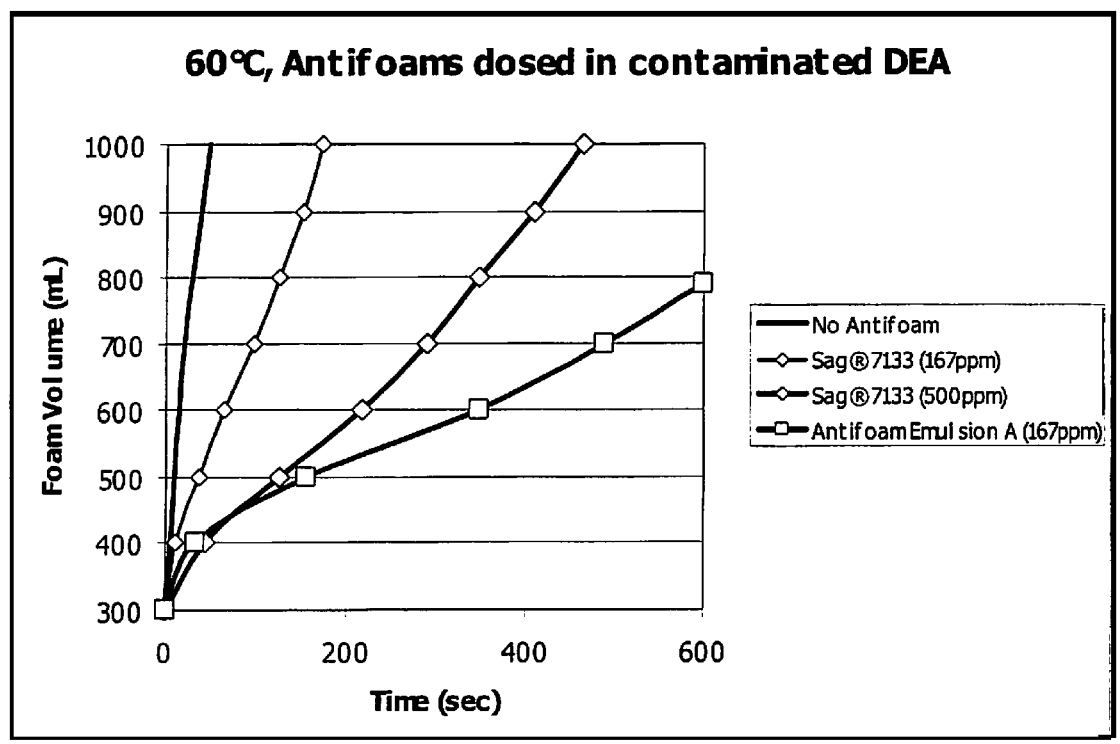
FIG. 2 compares the foam controlling ability of silicone antifoam component without PPG (i.e., Sag®7133) at a dosing of 167 ppm or 500 ppm in a 30 to 40 weight percent aqueous solution of DEA which also contained 0.1 one weight percent (0.1 wt %) of an anionic surfactant, such as sodium lauryl sulfate, to stabilize the foam against a formulation containing a combination of silicone antifoam component and PPG (i.e., ANTIFOAM EMULSION A) at a dosing of 167 ppm at approximately 60° C. in a similarly concentrated DEA solution.

FIG. 2 compares the foam controlling ability of silicone antifoam component without PPG (i.e., Sag®7133) at a dosing of 167 ppm or 500 ppm in a 30 to 40 weight percent aqueous solution of DEA which also contained zero point one weight percent of an anionic surfactant, such as sodium lauryl sulfate, to stabilize the foam against a formulation containing a combination of silicone antifoam component and PPG (i.e., ANTIFOAM EMULSION A) at a dosing of 167 ppm under the same conditions in a similarly concentrated DEA solution.

Significantly, the results of FIG. 2 demonstrate that a formulation of the present invention (i.e., ANTIFOAM EMULSION A) achieves substantially improved foam suppression at a dosing of 167 ppm as compared to silicone antifoam component without PPG (i.e., Sag®7133) at a far greater dosing of 500 ppm.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

We claim:

1. A low-foaming gas processing composition consisting essentially of:
   (a) a silicone antifoam component comprising a base silicone fluid and a particulate metal oxide;
   (b) an emulsifying component in an amount suitable for the at least substantial emulsification of the silicone antifoam component in water;
   (c) a polypropylene glycol component at least partially soluble, emulsifiable, and/or dispersible in water;
   (d) a water-soluble or water-dispersible gas processing agent; and
   (e) water
   wherein the silicone antifoam component further comprises (i) one or more branched silicone resins selected from the group consisting of MQ, MDQ and T silicone resins, or (ii) one or more catalysts capable of promoting condensation reactions between siloxy groups; wherein M represents monovalent groups of formula $(CH_3)_3SiO_{1/2}$, D represents divalent groups of formula $(CH_3)_2SiO_{2/2}$, T represents trivalent groups of formula $(CH_3)SiO_{3/2}$, and Q represents tetravalent groups of formula $SiO_{4/2}$.

2. The composition of claim 1, wherein the base silicone fluid is a silicone oil and the particulate metal oxide is particulate silica.

3. The composition of claim 2, wherein the particulate silica is selected from the group consisting of fumed silica, precipitated silica, and combinations thereof.

4. The composition of claim 2, wherein the particulate silica is pre-hydrophobized with an organosilane or alkyl-containing silicone fluid.

5. The composition of claim 1, wherein the emulsifying component comprises one or a combination of emulsifying agents selected from organic emulsifiers and silicone-based emulsifiers.

6. The composition of claim 5, wherein the emulsifying component comprises one or a combination of polydimethylsiloxane-polyoxyalkylene co-polymers.

7. The composition of claim 6, wherein the polydimethylsiloxane-polyoxyalkylene co-polymer has a polydimethylsiloxane portion bound to a polyoxyalkylene portion selected from the group consisting of a polyoxyethylene group, polyoxypropylene group, and combinations thereof.

8. The composition of claim 1, wherein the water-soluble or water-dispersible gas processing agent is a gas sweetening amine selected from the group consisting of alkanolamines, alkylamines, and combinations thereof.

9. The composition of claim 8, wherein the gas sweetening amine is one or more alkanolamines selected from the group consisting of monoethanolamine, diethanolamine, diisopropanolamine, triethanolamine, N-methyldiethanolamine, monomethylethanolamine, (2-(2-aminoethoxy)ethanol, and combinations thereof.

10. The composition of claim 8, wherein the gas sweetening amine is one or more alkylamines selected from the group consisting of monoalkylamines, dialkylamines, trialkylamines, and combinations thereof.

11. The composition of claim 1, wherein the polypropylene glycol and silicone antifoam component are in a polypropylene glycol to silicone antifoam component weight ratio range of approximately 1:20 to 200:1.

12. The composition of claim 1, wherein the polypropylene glycol to silicone antifoam component weight ratio is within the approximate range 2:1 to 100:1.

13. A method for processing a gas, the method comprising treating the gas with a composition consisting essentially of:
   (a) an antifoam component comprising a base silicone fluid and a particulate metal oxide, wherein the silicone fluid comprises (i) one or more branched silicone resins selected from the group consisting of MQ, MDQ and T silicone resins, and optionally (ii) one or more catalysts capable of promoting condensation reactions between siloxy groups; wherein M represents monovalent groups of formula $(CH_3)_3SiO_{1/2}$, D represents divalent groups of formula $(CH_3)_2SiO_{2/2}$, T represents trivalent groups of formula $(CH_3)SiO_{3/2}$, and Q represents tetravalent groups of formula $SiO_{4/2}$;
(b) an emulsifying component in an amount suitable for the at least substantial emulsification of the silicone antifoam component in water;
(c) a polypropylene glycol component at least partially soluble, emulsifiable, and/or dispersible in water;
(d) a water-soluble or water-dispersible gas processing agent; and
(e) water.

14. The method of claim 13, wherein the gas is at least substantially methane.

15. The method of claim 13, wherein the gas processing agent is regenerated by a gas desorption process.

16. A method for lowering or substantially removing an amount of base-reactive impurities from a gas, the method comprising treating the gas with a composition consisting essentially of:
(a) an antifoam component comprising a base silicone fluid and particulate silica, the particulate silica in an amount of up to about ten percent by weight of the antifoam component, wherein the silicone fluid comprises (i) one or more branched silicone resins selected from the group consisting of MQ, MDQ and T silicone resins, and optionally (ii) one or more catalysts capable of promoting condensation reactions between siloxy groups; wherein M represents monovalent groups of formula $(CH_3)_3SiO_{1/2}$, D represents divalent groups of formula $(CH_3)_2SiO_{2/2}$, T represents trivalent groups of formula $(CH_3)SiO_{3/2}$, and Q represents tetravalent groups of formula $SiO_{4/2}$;
(b) one or a combination of polydimethylsiloxane-polyoxyalkylene co-polymers;
(c) a polypropylene glycol component at least partially soluble, emulsifiable, and/or dispersible in water in a polypropylene glycol to silicone antifoam component weight ratio range of approximately 1:10 to 10:1;
(d) a gas sweetening amine; and
(e) water.

17. The method of claim 16, wherein the one or more base-reactive impurities are selected from carbon dioxide and sulfhydryl-containing compounds.

18. The method of claim 16, wherein the gas sweetening amine is regenerated by a gas desorption process.

19. A method for lowering or substantially removing an amount of one or more base-reactive impurities from a gas, the method comprising treating the gas with a composition prepared by:
(a) providing an antifoam composition consisting essentially of
(i) an antifoam component comprising a base silicone fluid and a particulate metal oxide, wherein the base silicone fluid comprises one or more branched silicone resins selected from the group consisting essentially of MQ, MDQ and T silicone resins, and optionally one or more catalysts capable of promoting condensation reactions between siloxy groups; wherein M represents monovalent groups of formula $(CH_3)_3SiO_{1/2}$, D represents divalent groups of formula $(CH_3)_2SiO_{2/2}$, T represents trivalent groups of formula $(CH_3)SiO_{3/2}$, and Q represents tetravalent groups of formula $SiO_{4/2}$;
(ii) an emulsifying component in an amount suitable for the at least substantial emulsification of the silicone antifoam component in water;
(iii) a polypropylene glycol component at least partially soluble, emulsifiable and/or dispersible in water;
(iv) water;
(b) providing an aqueous amine solution comprising one or more alkanolamines, alkylamines, or combination thereof, in aqueous solution; and
(c) mixing the antifoam composition with the aqueous amine solution to provide a mixture having the antifoam composition in a minimum amount of approximately 1 ppm to a maximum of about approximately 2000 ppm by weight of the silicone and polypropylenegylcol combination or by weight of the mixture.

* * * * *